United States Patent
Kienzle et al.

(10) Patent No.: US 11,505,500 B2
(45) Date of Patent: Nov. 22, 2022

(54) CERAMIC COMPONENT

(71) Applicant: SGL CARBON SE, Wiesbaden (DE)

(72) Inventors: Andreas Kienzle, Meitingen (DE); Dominik Rivola, Meitingen (DE); Oswin Oettinger, Meitingen (DE); Philipp Modlmeir, Meitingen (DE); Blasius Hell, Meitingen (DE)

(73) Assignee: SGL CARBON SE, Wiesbaden (DE)

( * ) Notice: Subject to any disclaimer, the term of this patent is extended or adjusted under 35 U.S.C. 154(b) by 108 days.

(21) Appl. No.: 16/650,151

(22) PCT Filed: Sep. 28, 2018

(86) PCT No.: PCT/EP2018/076545
§ 371 (c)(1),
(2) Date: Mar. 24, 2020

(87) PCT Pub. No.: WO2019/063832
PCT Pub. Date: Apr. 4, 2019

(65) Prior Publication Data
US 2020/0277234 A1 Sep. 3, 2020

(30) Foreign Application Priority Data
Sep. 28, 2017 (DE) .................. 10 2017 217 292.4

(51) Int. Cl.
*C04B 35/571* (2006.01)
*C04B 35/626* (2006.01)

(52) U.S. Cl.
CPC ........ *C04B 35/571* (2013.01); *C04B 35/6267* (2013.01); *C04B 35/6269* (2013.01);
(Continued)

(58) Field of Classification Search
CPC ............. C04B 35/571; C04B 35/6267; C04B 35/6269; C04B 2235/6026; C04B 2235/616; C04B 2235/3826
See application file for complete search history.

(56) References Cited

U.S. PATENT DOCUMENTS

| | | | |
|---|---|---|---|
| 2010/0015396 A1* | 1/2010 | Johnson | C04B 35/6264 428/142 |
| 2014/0044979 A1* | 2/2014 | Polster | C04B 35/573 428/448 |
| 2018/0339946 A1* | 11/2018 | Ottinger | C04B 35/657 |

FOREIGN PATENT DOCUMENTS

| | | | | |
|---|---|---|---|---|
| CN | 104496508 B | * | 8/2016 | ..... C04B 2235/6026 |
| CN | 106588060 A | * | 4/2017 | ........... C04B 35/806 |

(Continued)

OTHER PUBLICATIONS

International Search Report dated Dec. 21, 2018 and Written Opinion in corresponding International application No. PCT/EP2018/076545; 12 pages.
(Continued)

*Primary Examiner* — Noah S Wiese
(74) *Attorney, Agent, or Firm* — Maier & Maier, PLLC

(57) ABSTRACT

A ceramic component, wherein the component contains 20 to 60 wt. % SiC, 5 to 40 wt. % free silicon and 10 to 65 wt. % free carbon. The disclosure also relates to the use of the component. The method for producing the ceramic component includes the following steps: a) providing a green body based on carbon, which has been produced by means of a 3D-printing method, b) impregnating the green body with a solution selected from the group consisting of a sugar solution, a starch solution or a cellulose solution, or a resin system including a mixture containing at least one resin, at least one solvent and at least one curing agent, wherein the
(Continued)

at least one resin and the at least one solvent are different, c) drying or curing the impregnated green body.

14 Claims, 3 Drawing Sheets

(52) U.S. Cl.
CPC .......................... *C04B 2235/6026* (2013.01); *C04B 2235/616* (2013.01); *C04B 2235/65* (2013.01)

(56) References Cited

FOREIGN PATENT DOCUMENTS

| DE | 69927854 T2 | * | 7/2006 | ........... C04B 35/565 |
| EP | 1359132 A1 | * | 11/2003 | ............. C04B 35/83 |
| EP | 2998282 A1 | * | 3/2016 | ........... B29C 64/153 |
| WO | WO-2016033616 A1 | * | 3/2016 | ........... C04B 35/634 |
| WO | 2017089494 A1 | | 6/2017 | |

OTHER PUBLICATIONS

Jooho Moon et al. "Fabrication of functionally graded reaction infiltrated SiC-Si composite by three-dimensional printing (3DP(TM)) process" Materials Science and Engineering: A, Amsterdam, NL, vol. 298, No. 1-2, Jan. 1, 2001 (Jan. 1, 2001), pp. 110-119, 10 pgs.

* cited by examiner a)

b)

a)

b)

CERAMIC COMPONENT

FIELD

The present disclosure relates to a ceramic component containing silicon carbide (SiC) and to the use of the component.

BACKGROUND

Silicon carbide ceramics are generally characterised by their high hardness, good abrasion resistance, high chemical stability, high strength even at high temperatures and good temperature resistance with low thermal expansion and high thermal conductivity. One way to produce this ceramic is to press carbon-containing fillers together with a binding agent and to cure them to form a green body. The green body is then carbonised or pyrolysed at an increased temperature, in such a manner that a carbon body is created, which is infiltrated with liquid silicon, wherein the carbon reacts with silicon and forms silicon carbide. Usually, such a method results in a composite material which, in addition to SiC, contains unreacted carbon, so-called free carbon, and free silicon. Such a composite material is called a C/Si/SiC composite material. In this context, the terms "free silicon" and "free carbon" refer to the elements in their pure form that are not chemically bonded or are only bonded to themselves. In such a composite material, the silicon carbide and the free carbon are inert constituents, whereas the free silicon is the least chemically and thermally stable constituent and cannot withstand attack from, e.g. hydrofluoric acids or hot alkalis such as hot NaOH or hot KOH—in contrast to free carbon and silicon carbide. Since the free silicon is meltable, the operating temperature of the C/Si/SiC composite material is also limited to a temperature lower than the melting temperature of silicon, which is 1414° C. The free carbon in such a composite material can in principle be attacked by oxidising media, but the carbon is surrounded by a SiC coating and thereby protected by the liquid siliconisation.

Components made of silicon carbide ceramics, which have a complex geometric structure, are difficult to produce by simple mechanical processing due to the high hardness of the ceramic. However, such components can be produced easily and cost-effectively by means of an additive manufacturing method, the 3D-printing method.

J. Moon et al., Materials Science and Engineering A298, 2001, 110-119 describe the production of a ceramic composite material containing SiC, in which a carbon shaped body is produced using a powder of glassy carbon and a mixture of furfuryl resin/acetone as binding agent by means of the 3D-printing method. Following the pyrolysis of the shaped body, siliconisation is performed under vacuum. The C/Si/SiC composite materials produced in this manner have an inhomogeneous microstructure composition, comprising comparatively large lakes or regions of free silicon and amounts of free carbon, as can be seen from the microscopic images. The free carbon corresponds in this case to the carbon not converted to SiC, which is surrounded by SiC.

WO 2017/089494 A1 discloses ceramic composite materials containing SiC, which have also been produced using the 3D-printing method. In this case a carbon body is produced using a powder comprising coke and a liquid binding agent such as furan resin or phenolic resin. Following the carbonisation of the resulting carbon body, siliconisation is performed. The C/Si/SiC composite materials produced in this manner typically have a free silicon content of more than 30 weight percent (wt. %) and a free carbon content of around 40 wt. %. These composite materials also show an inhomogeneous microstructure composition having comparatively large lakes or regions of free silicon and an amount of free carbon, which substantially originates from the carbon powder.

Due to the inhomogeneous microstructure composition, in particular the presence of large lakes or regions of free silicon, the chemical stability, in particular against acids or hot alkalis such as hydrofluoric acid or hot NaOH liquor, and the temperature resistance of the ceramic composites containing silicon carbide are reduced.

The object of the present invention is therefore to provide a ceramic component containing silicon carbide which, in addition to high hardness, high strength, good abrasion resistance, also has high chemical stability and good temperature resistance. In addition, it should be possible to manufacture this component with practically unlimited geometric complexity simply and cost-effectively.

SUMMARY

Within the scope of the present invention, this object is achieved by providing a ceramic component containing silicon carbide (SiC) obtainable by a method comprising the following steps:
  a) providing a green body based on carbon, which has been produced by means of a 3D-printing method,
  b) impregnating the green body with a solution selected from the group consisting of a sugar solution, a starch solution or a cellulose solution, or a resin system comprising a mixture containing at least one resin, at least one solvent and at least one curing agent, wherein the at least one resin and the at least one solvent are different,
  c) drying or curing the impregnated green body,
  d) carbonising the dried or cured green body, wherein a fine-pored, foam-like carbon skeleton is created from the dried solution or a fine-pored, foam-like carbon skeleton is created from the cured resin system,
  e) siliconising the carbonised green body by infiltration with liquid silicon.

According to the invention, it was recognised that if an above solution or a resin system comprising at least one resin, at least one solvent and at least one curing agent is used for impregnating the green body based on carbon, where the at least one resin and the at least one solvent are different, during carbonisation of the dried or cured green body, a fine-pored, foam-like or sponge-like carbon skeleton is formed from the dried, fine-pored, foam-like solution or the cured, sponge-like, fine-pored resin system (see FIG. 2). If the term "sponge-like carbon skeleton" is used in the following, this term also stands for a foam-like carbon skeleton. During siliconisation of such a green body, the pores of the green body are filled with silicon, as a result of which the pore volume of the sponge-like carbon skeleton is almost completely filled with silicon carbide. This filling of the pores has the consequence that the amount of comparatively large lakes or regions of free silicon is significantly reduced compared to the state of the art, as can be seen in FIG. 3. The free silicon is thus no longer present in the form of large lakes or regions, but silicon carbide formations are present in these pores. The presence of these silicon carbide formations, which fill the pores, leads to higher chemical stability, greater hardness and to greater temperature resistance of the ceramic component. When using a resin system to impregnate the green body, it is crucial that the at least one resin and the at least one solvent are different. If the at least one resin and the at least one solvent are identical, the carbonisation of the cured green body based on carbon does not produce a fine-pored, sponge-like carbon skeleton, but a compact resin carbon form (see FIG. 1). During siliconisation, this leads to the fact that the carbonised resin carbon can only be converted into SiC on the surface and a large part of the interior of the resin carbon is retained due to the lack of accessibility for silicon as carbon, as a result of which the SiC content is only slightly increased by comparison.

The green body based on carbon in step a) is produced by means of a 3D-printing method. Such a green body can be produced in accordance with the method described in WO 2017/089494.

In this method, a powdery composition having a granulation (d50) of between 3 µm and 500 µm, preferably between 50 µm and 350 µm, more preferably between 100 µm and 250 µm, comprising at least 50 wt. % of coke, preferably at least 80 wt. %, more preferably at least 90 wt. % and particularly preferably at least 95 wt. % of coke, and a liquid binding agent are provided. This is followed by a surface deposition of a layer of the powdery composition, followed by a local deposition of droplets of the liquid binding agent onto this layer. These steps are repeated until the desired shape of the component is produced, wherein the individual steps are adapted to the desired shape of the component. This is followed by at least partial curing or drying of the binding agent, resulting in the green body having the desired shape of the component. The aforementioned powdery composition can be either a powder of primary particles or a granulate. The term "d50" means that 50% of the particles are smaller than the specified value. The d50 value was determined with the aid of the laser granulometric technique (ISO 13320), wherein a measuring device from Sympatec GmbH with associated evaluation software was used.

Obtaining a green body having the desired shape of the component is understood to mean the following. Immediately after the curing or drying of the binding agent, the green body is still surrounded by a bulk powder made of loose particles of the powdery composition. The green body must therefore be removed from the bulk powder or separated from the loose, non-solidified particles. In the literature about 3D-printing this is also called "unpacking" the printed component. Unpacking of the green body can be followed by (fine) cleaning of the same in order to remove adhering particle residues. Unpacking can be performed, for example, by vacuuming the loose particles with a powerful vacuum cleaner. However, the kind of unpacking is not particularly restricted and all known techniques can be used.

Although the kind of coke used is not particularly restricted, according to a preferred embodiment of the present invention, the green body in step a) is produced using coke preferably selected from the group consisting of acetylene coke, flexicoke, fluid coke, petroleum coke, shot coke, coal tar pitch coke, carbonised ion exchange bead coke and any mixtures thereof, more preferably selected from the group consisting of acetylene coke, flexicoke, fluid coke, shot coke, carbonised ion exchange bead coke and any mixtures thereof. The advantage of using these cokes is that they have a coke shape that is as round as possible, wherein the round shape leads to good pourability and therefore to a smooth 3D-printing process. Furthermore, a coke shape that is as round as possible contributes to an increased breaking resistance of the ceramic component. This is probably due to the round and partly onion-skin-like structure of these coke varieties. These cokes can be used as so-called green coke or as calcined or carbonised or graphitised coke. Green coke is a coke which still contains volatile constituent parts. These volatile constituent parts are almost non-existent in the calcined or carbonised coke, wherein this coke undergoes a temperature treatment of typically 700° C. to 1400° C. The terms "calcined" or "carbonised" are understood as synonyms. Graphited coke is obtained by treating the coke at a temperature normally above 2000° C. to 3000° C.

In the production of the green body, it can be advantageous to add a liquid activator, such as a liquid sulphuric acid activator, to the coke. By using such an activator, the curing time and the temperature required for curing the binding agent can be reduced on the one hand, and the dust development of the powdery composition is reduced on the other. Advantageously, the amount of activator is 0.05 wt. % to 3.0 wt. %, more preferably 0.1 wt. % to 1.0 wt. %, based on the total weight of coke and activator. If more than 3.0 wt. % based on the total weight of activator and coke is used, the powdery composition will stick together and the pourability will be reduced; if less than 0.05 wt. % based on the total weight of the coke and activator, the amount of activator that can react with the binding agent, more precisely the resin constituent of the binding agent, is too small to achieve the desired above benefits.

The choice of the binding agent used to produce the 3D-printed green body is not particularly restricted. Suitable binding agents are, for example, phenolic resins, furan resins, polyimides, cellulose, starch, sugar, silicates, silicon-containing polymers, pitch, polyacrylonitrile (PAN) or any mixtures thereof. Solutions of the aforementioned binding agents are also included here. Generally, the binding agents should be designed in such a manner that stable bodies can be obtained after carbonisation, which are able to withstand handling during transfer to the siliconisation apparatus and the temperature applied during siliconisation. The binding agent should in this case either have a sufficiently high final carbon yield or a Si-containing inorganic yield when using Si-organic binding agents after pyrolysis. When choosing thermoplastic binding agents such as pitch, it may be necessary to carbonise the entire powder bed in order to decompose it and thereby ultimately to crosslink it. The same applies to PAN. The powder bed without additive binding agent acts as a support for the component, while the thermoplastic binding agent such as pitch or PAN is carbonised. In addition, the powder bed acts advantageously as oxidation protection for the printed green body during the subsequent carbonisation treatment.

As binding agents, phenolic resins, furan resins or polyimides represent resins and polymers having a comparatively high carbon yield. They belong to the class of binding agents that are converted into a non-meltable binding system by curing and are largely converted into SiC during the siliconisation. Due to their high carbon yield, generally not all the carbon is converted into SiC during the siliconisation and carbon inclusions occur, resulting in an overall lighter component. Furthermore, the high carbon yield means that the content of free silicon in the component is correspondingly lower, resulting in improved chemical stability and higher temperature resistance.

However, cellulose, starch or sugar, preferably in solution, can also be used as binding agents. These binding agents only need to be dried, which is inexpensive, and the carbon residue resulting from the carbonisation is ideally, i.e. substantially completely, converted into SiC during the siliconisation.

The use of silicates or silicon-containing polymers as binding agents, preferably as a solution, also has the advantage that these binding agents also only need to be cured. They form SiC on their own during the carbonisation. Furthermore, wetting with liquid Si is better than with carbon, which facilitates the siliconisation step.

Preferably the amount of binding agent in the green body is 1.0 to 35.0 wt. %, preferably 1.0 to 10.0 wt. % and most preferably 1.5 to 5.0 wt. %, based on the total weight of the green body.

In a further preferred embodiment of the present invention, the green body according to step a) contains silicon carbide in addition to carbon, preferably this green body contains up to 50 wt. % of SiC relative to the total weight of the green body. The SiC used is in the form of a powder, which preferably has a granularity (d50) between 50 and 500 µm, more preferably between 75 and 200 µm. For determining the d50 value, the laser granulometric technique (ISO 13320) was also used here, using a measuring device from Sympatec GmbH with associated evaluation software.

By using SiC powder in the production of the green body, the oxidation stability of the ceramic component produced therewith is increased from the beginning, since the amount of free carbon in this component is reduced. Furthermore, this component has a high inertness to acids and alkalis, for example, and the temperature resistance is maintained. The high final SiC content also increases the hardness of the component.

To produce a green body containing silicon carbide in addition to carbon, the 3D-printing method described above for coke can be applied, wherein instead of coke a mixture of coke and silicon carbide is used for the surface deposition step.

Within the scope of the invention, impregnating the green body according to step b) is performed with a solution or a resin system. The solution may be a sugar solution, preferably a monosaccharide, polysaccharide or mannitol solution, a starch solution or a cellulose solution.

It is assumed that these solutions, when dried, lead to a foam-like carbon skeleton during the carbonisation. Drying occurs when the above solutions are used for the impregnation. If a resin system is used to impregnate the green body, the curing step occurs after the impregnation.

The use of such a solution for the impregnation has the advantage that these solutions do not require pot times.

If a resin system is used to impregnate the green body according to step b), the preferred resin is a phenolic resin, a furan resin or any mixture of a phenolic resin and a furan resin.

In a resin system, the at least one solvent is preferably selected from the group consisting of water, a monohydric or polyhydric alcohol, a mixture of at least two of the aforementioned alcohols, a mixture of water and at least one monohydric and/or polyhydric alcohol or naphthalene. For example, methanol, ethanol, propanols (n-propanol, isopropanol) or butanols, for example, n-butanol or sec-butanol, preferably ethanol, can be used as monohydric alcohols; the divalent alcohol glycol or the trivalent alcohol glycerol, for example, can be used as polyhydric alcohols.

It is assumed that the solvent is enclosed in the resin system in the curing step in the form of fine droplets of homogeneous size, and then escapes during the carbonisation step, forming empty, i.e. unfilled, pores that provide a kind of sponge structure. Consequently, the pores have a homogeneous size, which is advantageous with regard to the subsequent homogeneous conversion of the amorphous carbon into silicon carbide. In this way, a fine-pored, sponge-like carbon skeleton is created from the cured resin system. The pores of the sponge-like carbon skeleton preferably have an average pore size of less than 50 µm, more preferably of less than 20 µm, particularly preferably of less than 10 µm and most particularly preferably of less than 5 µm. The average pore size can be determined, for example, by a quantitative framework analysis in a light microscope or in a scanning electron microscope. This pore formation greatly increases the accessible surface of the carbon skeleton created from the cured resin system, which ensures that the liquid silicon according to step e) can fill these pores to a large part completely. The accessible surface of the carbon skeleton becomes larger, the smaller the average pore size is. Since the carbon of the aforementioned carbon skeleton reacts quickly with the liquid silicon, this carbon can be largely converted into silicon carbide. At the same time, the sponge structure fills the original pores of the green body as far as possible, which significantly reduces the lakes or regions of free silicon during the subsequent silicon infiltration.

The resin system used for impregnating the green body according to step b) preferably comprises as curing agent an inorganic or organic acid, preferably an acid selected from the group consisting of diluted sulphuric acid, hydrochloric acid, phosphoric acid, boric acid, oxalic acid, maleic anhydride, citric acid, malic acid, benzene sulphonic acids or phenol sulphonic acids, more preferably benzene sulphonic acids or phenol sulphonic acids, particularly preferably para-toluene sulphonic acid. A curing agent is in this case a chemical compound that causes the resin used to cure.

According to a further preferred embodiment of the present invention, it is possible that the at least one solvent is replaced by at least one blowing agent. Advantageously, the at least one blowing agent is selected from the group consisting of halogenated hydrocarbons, preferably trichlorotrifluoroethane, pentanes, preferably n-pentane, isopentane and cyclo-pentane, or tin chloride. The resin system for impregnating the green body according to step b) may also comprise a mixture of one of the aforementioned curing agents and one of the aforementioned blowing agents. If at least one blowing agent is used in the resin system, a two-constituent resin, preferably a polyurethane resin or an isocyanate resin, may be used as at least one resin.

According to a further preferred embodiment of the present invention, curing of the impregnated green body in step c) can be performed at room temperature or by using a temperature which is lower than the boiling temperature of the solvent or solvent mixture used, preferably curing is performed at room temperature. Curing at room temperature is preferred as no temperature application is necessary, which is a more cost-effective method step. This curing at room temperature is possible because the resin system comprises a curing agent. Furthermore, the speed of the curing can be controlled in a targeted manner by the amount of curing agent added. The aim is to achieve a curing time in a range from 10 minutes to 10 hours. This adjustable curing time depends on the desired processing times. After curing, the resin used is non-meltable and can therefore be carbonised. A further advantage of curing at room temperature is that the application of temperature leads to a temporary reduction of the resin viscosity and therefore to the resin leaking from the pores of the green body. Such a leaking causes firstly a loss of resin and secondly the green body can lose its shape as parts of the resin unintentionally stick to the lower part of the green body like a kind of "elephant foot".

The term "carbonising" according to step d) means the thermal conversion of the resin system, which the green body contains, to carbon. Carbonisation can be achieved by heating to temperatures in a range from 500° C.-1100° C., preferably from 800° C. to 1000° C., under a protective gas atmosphere (e.g. under an argon or nitrogen atmosphere) with subsequent holding time. With regard to the enclosed solvent in the pores, it is advantageous if heating to the carbonisation temperature is carried out carefully, as this enclosed solvent (usually water) must first be expelled. If this expelling does not occur slowly or cautiously, the green body may explode.

The siliconisation of the carbonised green body with liquid silicon according to step e) can generally occur under a protective gas atmosphere (e.g. Ar or He), in overpressure, normal pressure or in a vacuum, preferably under vacuum. For the creation of filigree and complex structures, such as undercuts, hollow spaces or cooling channels, it is necessary for the liquid silicon to be able to infiltrate the carbonised green body by itself, purely by capillary forces. The present carbonised green bodies have exactly this desired property, i.e. the pore system of the carbonised green bodies can be designed by means of the 3D-printing method in such a manner that the green bodies are infiltrated completely and practically pore-free with silicon purely by capillary forces and without additional pressurisation. Furthermore, the cooling process after infiltration does not cause the silicon to leak out again, in addition to the usual silicon leakage based on the density change in the silicon. The infiltration of the carbonised green body with liquid silicon in a vacuum is particularly effective, as the carbon is better wetted by the silicon and the suction behaviour of the green body is improved. Furthermore, siliconisation can be performed in vacuum at a lower temperature, wherein this temperature must of course be above the melting temperature of silicon. The above step e), i.e. the siliconisation, is therefore preferably performed under vacuum. Within the scope of the present invention, the liquid silicon referred to in this context also comprises silicon alloys having a silicon content of at least 50 wt. %. However, pure silicon is preferably used.

In step e), the siliconising, the green body to be siliconised preferably rests on wicks, which protrude from a bath of silicon melt. Similar to the green body itself, the wicks in this case are able to conduct the liquid silicon through their porous structure by capillary forces. The green body itself is not immersed in the silicon bath but is located above it. After siliconisation and cooling to room temperature, the wick is connected to the component by the solidified silicon and must therefore be removed mechanically. In order to further simplify the method according to the invention, the wicks are preferably already provided as part of the green body, i.e. they are "printed" onto the green body during the production of the green body by means of 3D-printing. Thus, the green body with the wicks pointing downwards can simply be placed in the container provided for the silicon bath. After siliconisation and cooling is completed, the wicks are mechanically removed as before.

Within the scope of the present invention, it is also possible that steps d) and e), i.e. carbonising and subsequent siliconising of the cured, impregnated green body, are practically performed in a single method step, as the green body already carbonises during siliconising when heated to the siliconising temperature—in situ, so to say.

According to a further preferred embodiment of the present invention, after carbonising according to step d), the steps of impregnating according to step b), drying or curing according to step c) and carbonising according to step d) can be repeated at least once in the aforementioned order before the siliconising according to step e) is performed. Through these additional steps, the pores of the green body skeleton are filled even more completely with the fine-pored sponge-like carbon skeleton, which is created by carbonising the dried solution or the cured resin system. Due to the higher amount of this sponge-like carbon skeleton, the amount of carbon, which is converted into SiC during the subsequent siliconisation, is further increased; as a result, the SiC amount in the ceramic component is further increased and the amount of free silicon in this component is simultaneously advantageously reduced.

Advantageously, the first impregnation is performed with a resin system and the second impregnation with a sugar, starch or cellulose solution. In the first impregnation step, a fine-pored, sponge-like carbon skeleton is formed after carbonisation, which however does not completely fill the pores between the carbon grains. By using a sugar, starch or cellulose solution in the second impregnation step, which forms a foam-like carbon skeleton during carbonisation, the remaining pore spaces between the carbon grains are almost completely filled. This further increases the amount of carbon, which is converted into SiC during the subsequent siliconisation and therefore reduces the amount of free silicon in the ceramic component. Further, the density of the ceramic component is increased by this second impregnation step.

The lower amount of free silicon increases the chemical resistance and temperature resistance of the ceramic component and the higher amount of silicon carbide increases the hardness, stiffness and strength of the ceramic component.

This pore formation greatly increases the accessible surface of the carbon skeleton resulting from the cured resin system, which ensures that the liquid silicon according to step e) can fill these pores for the most part completely. Since the carbon of the aforementioned carbon skeleton reacts quickly with the liquid silicon, this carbon can be largely converted into silicon carbide.

Within the scope of the invention, it is also preferred that between steps a) and b) the following steps are performed at least once:
  i) impregnating the green body with an impregnating agent selected from the group consisting of phenolic resins, furan resins or pitch,
  ii) if necessary, curing the impregnated green body,
  iii) carbonising the green body from step i) or ii), wherein no fine-pored, sponge-like carbon skeleton is formed after the carbonisation.

These steps result in a redensification of the green body, which leads to a higher stability of the carbonised body. A possible warping or tearing of the carbonised body during the subsequent method steps, for example siliconisation treatment, can thus be minimised.

It is also possible that this redensification is performed by means of chemical vapour infiltration (CVI). In this case, hydrocarbon gases, such as methane or propane, are introduced into the pores of the carbon body at high temperatures in the range from 950° C.-1500° C. and at reduced pressure and are decomposed in such a manner that the carbon is deposited on all the pore walls, thus creating a more stable carbon body.

A further aspect of this invention comprises the method of producing a ceramic component containing silicon carbide (SiC) as described in the application.

The ceramic component according to the invention, which is based on a green body in the production of which no SiC powder, but only carbon powder, was used, contains 20 to 60 wt. %, preferably 30 to 50 wt. %, SiC, 5 to 40 wt. %, preferably 10 to 20 wt. %, free silicon, and 10 to 65 wt. %, preferably 30 to 50 wt. %, free carbon. The amount of free silicon, of free carbon and of silicon carbide in the ceramic components was determined according to DIN EN ISO21068-2. The lower the amount of free silicon, the higher the chemical stability and temperature resistance of the ceramic component. The amount of free carbon is important for the oxidation resistance and stability of the ceramic component. The higher the carbon content, the lower the oxidation resistance and stability of the ceramic component. However, a high amount of free carbon leads to a lower density and therefore to a lighter ceramic component. In addition, a ceramic component having a high amount of free carbon is less brittle. In addition, it can be assumed that the SiC, which surrounds the free carbon, increases the oxidation stability of the carbon.

The ceramic component according to the invention, which is based on a green body in the production in which no SiC powder was used, preferably has a breaking work of at least 200 Nmm, more preferably of at least 250 Nmm, particularly preferably of at least 300 Nmm. The breaking work was determined here from the surface of the bending deformation curve of the 3-point bending method.

The ceramic component according to the invention, which is based on a green body in the production in which no SiC powder was used, also preferably has a strength of at least 40 MPa, more preferably of at least 60 MPa, particularly preferably of at least 70 MPa, most preferably of at least 80 MPa. This component is therefore also sufficiently stable with regard to mechanical load. The strength was determined using the 3-point bending method according to DIN 51902.

The three-dimensional ceramic component according to the invention, whether or not SiC powder was used in the green body on which the component is based, is characterised by its electrical conductivity, its high chemical and mechanical stability and hardness and its resistance to abrasion. A further aspect of the present invention is therefore the use of the three-dimensional ceramic component according to the invention as an impeller and a separating or rotary vane in pumps and compressors, as a pump housing, in particular in the chemical industry, as installations in columns, as static mixing elements, as turbulators, as burner nozzles, as burner inserts, as a lining for burner walls, as an electrical contact, as electrical heating elements and support frames in high temperature ovens (in particular because of the good thermal shock resistance) and as a classifier wheel for mills for classifying mixtures of particles of different grain sizes.

Furthermore, this ceramic component according to the invention is characterised by good thermal conductivity and high chemical stability, high temperature stability and high thermal shock resistance. An even further aspect of the present invention is therefore the use of the ceramic component according to the invention as a heat exchanger, as an element for heat exchangers, as a hot press matrix, as a cooling body in electronics, as a cooling housing for light-emitting diodes or cameras or as a measuring gauge.

Furthermore, this ceramic component according to the invention is characterised by its high mechanical hardness and abrasion resistance. This makes it particularly suitable for use as a mechanically stressed component, such as a sliding element in bearings or hinges comprising sliding bearings and sliding ring seals, a lug in gears, a toothed gear, a sliding plate and a sliding tube of flexible shafts, a piston and a piston sleeve, or of processing tools in the form of milling cutters, drills, drill heads or reversing cutting plates. A further aspect of the present invention is therefore the use of the ceramic component according to the invention as a mechanically stressed component comprising the above mechanically stressed components.

Since the ceramic component according to the invention has a high abrasion resistance, it is suitable as a friction element for clutches and brakes. A further aspect of the present invention is therefore also the use of the ceramic component according to the invention as a friction element for clutches and brakes.

The aforementioned uses also relate to ceramic components containing silicon carbide which have been produced by the method described in the application.

BRIEF DESCRIPTION OF THE DRAWINGS

In the following, the present invention is further described by means of these explanatory but not restrictive examples with reference to the drawings.

DETAILED DESCRIPTION

Figure 1:
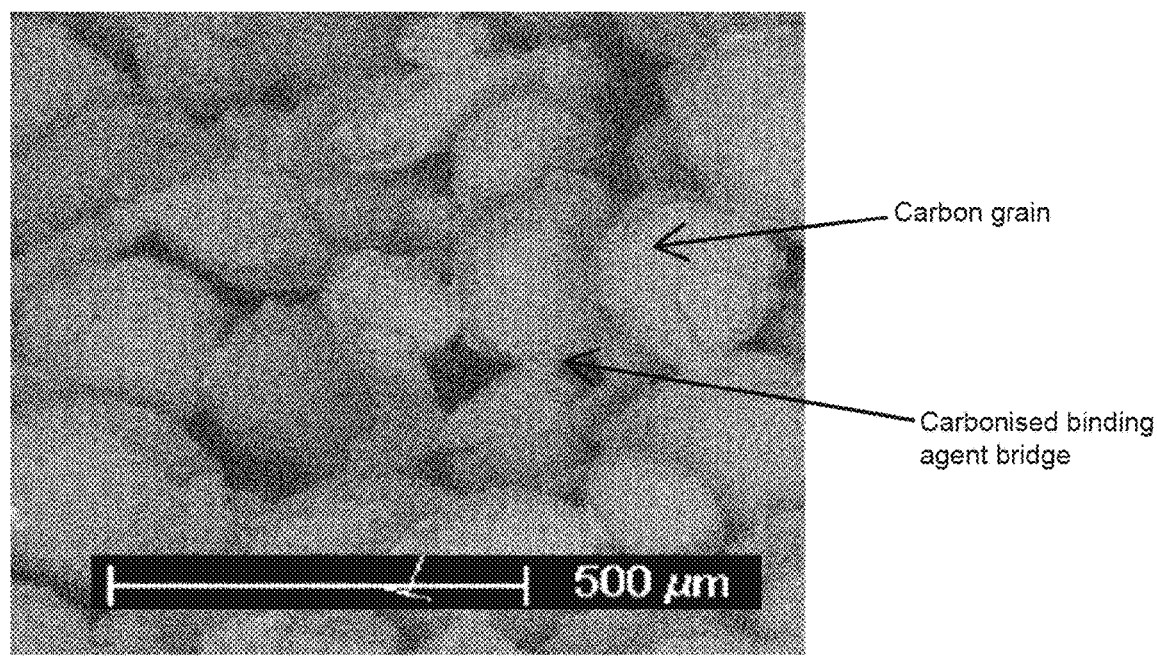
FIG. 1a) is a scanning electron microscope image (SEM image) of a carbonised green body based on carbon;
   b) is an SEM image of a carbonised green body based on carbon impregnated with furan resin and carbonised.
Figure 1:
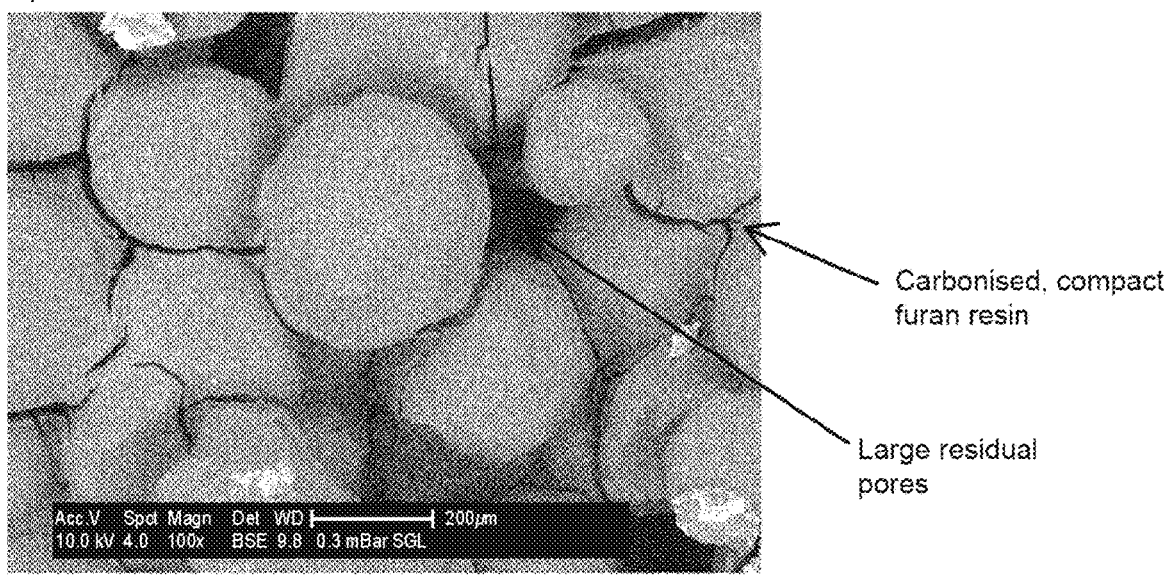

FIG. 1a) is an SEM image of a green body, based on carbon, which has been produced using a 3D-printing method. As can be seen from the image, carbon grains are connected to each other by carbonised binding agents, i.e. there are "carbonised binding bridges". The binding agent is the one that is used for the 3D-printing method.

FIG. 1b) is an SEM image of a green body based on carbon, which has been impregnated once with furan resin (10 parts furfuryl alcohol, 1 part maleic anhydride), cured and carbonised. In the resin system, the furfuryl alcohol has the function of the resin and at the same time the function of a viscosity-reducing solvent. The maleic anhydride acts as a curing agent. Before the carbonisation, the resin system was cured at 160° C. As can be seen from the image, the carbonised resin is located on the walls of the pores of the carbon skeleton. Large residual pores may be present between the carbon grains. Here the carbonised resin has not formed a fine-pored sponge-like carbon skeleton.

Figure 2:
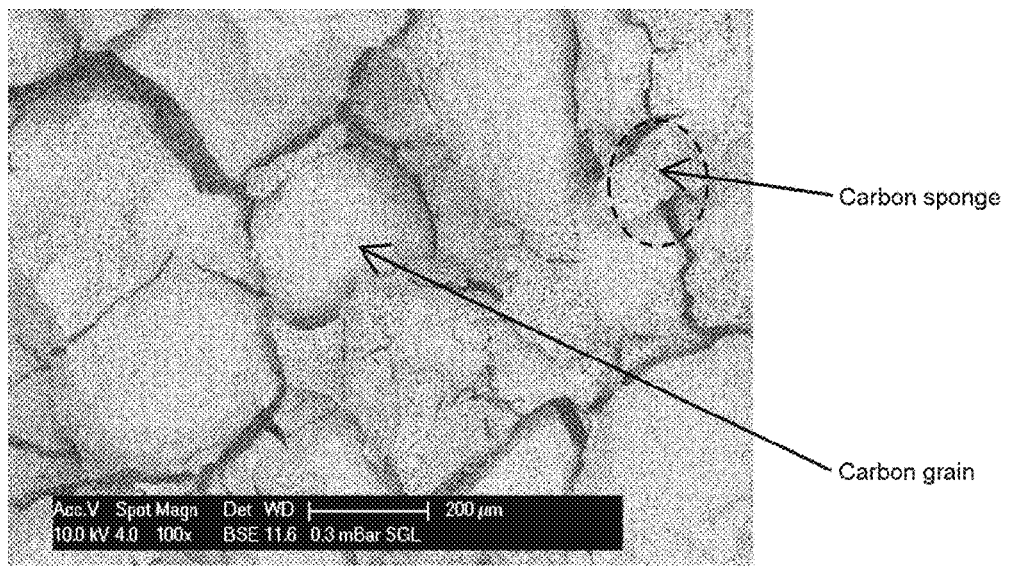
FIG. 2 is an SEM image of a carbonised green body based on carbon, which was additionally impregnated with a mixture containing Norsophen 1203 (a phenolic resin), water and para-toluenesulphonic acid, cured and then carbonised.
Figure 2:
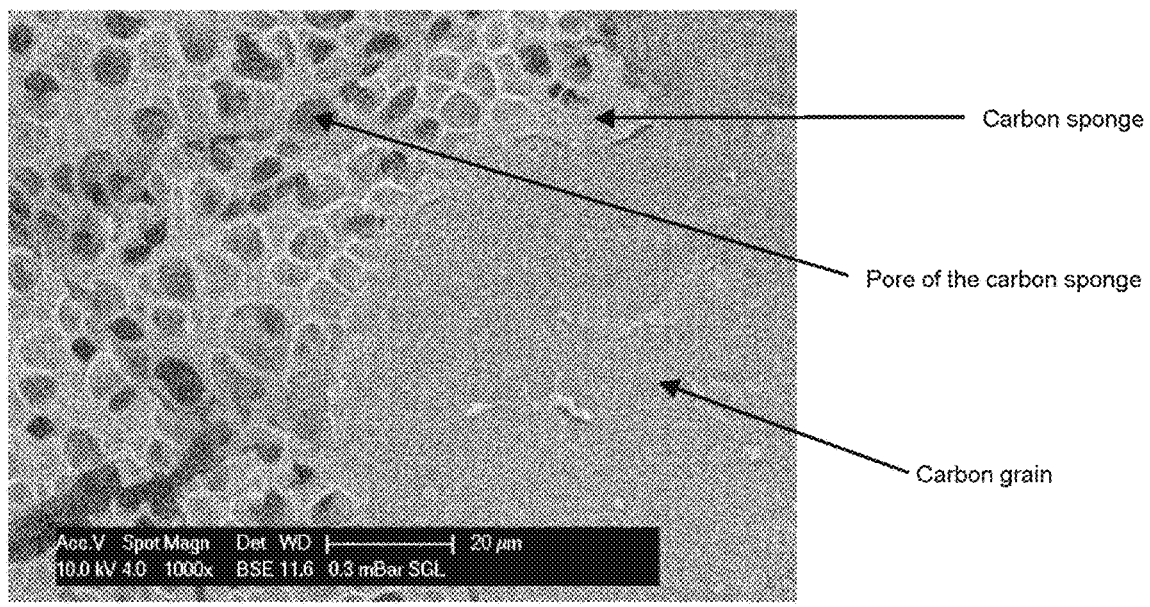

It can be seen from FIG. 2 that when a green body based on carbon is impregnated with a resin system comprising a mixture containing a resol resin (phenolic resin) with the trade name Norsophen 1203, water as solvent (and to reduce viscosity) and para-toluenesulfonic acid (dissolved in water) as curing agent, the carbonised green body has regions which form a fine-pored, sponge-like carbon skeleton. These regions are created during carbonisation from the cured resin system.

Figure 3:
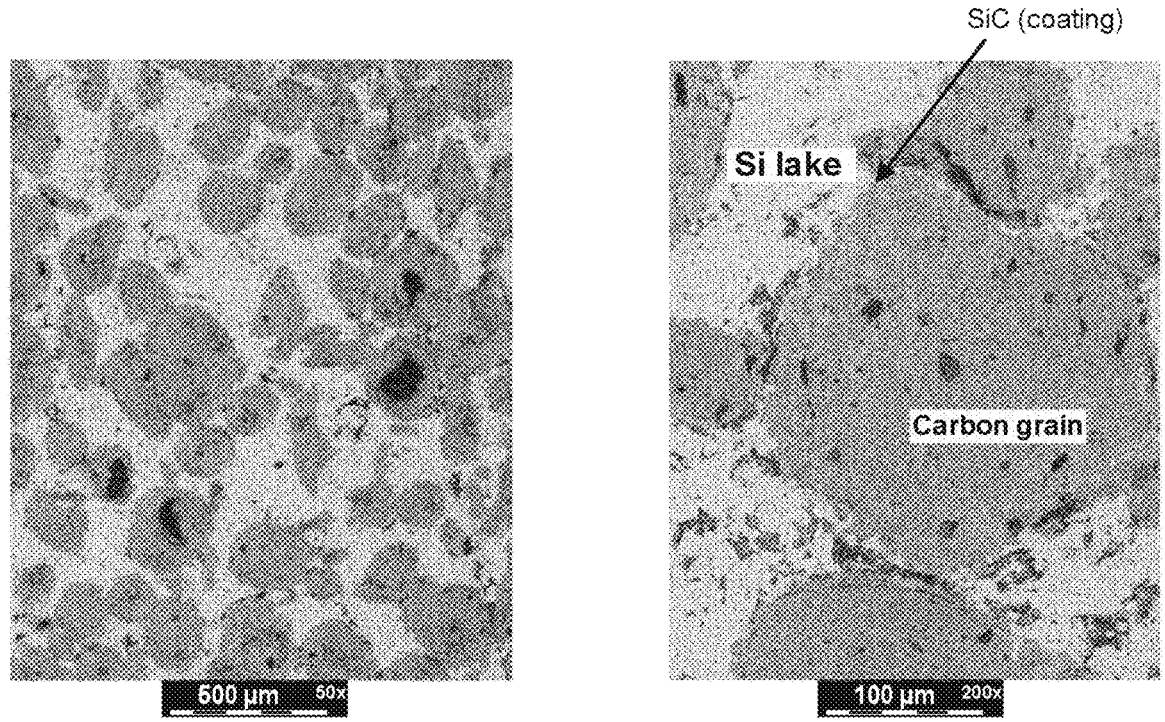
FIG. 3a) shows a microsection of a carbon-based ceramic component which has been directly siliconised;
   b) shows a microsection of a ceramic component according to the invention.
Figure 3:
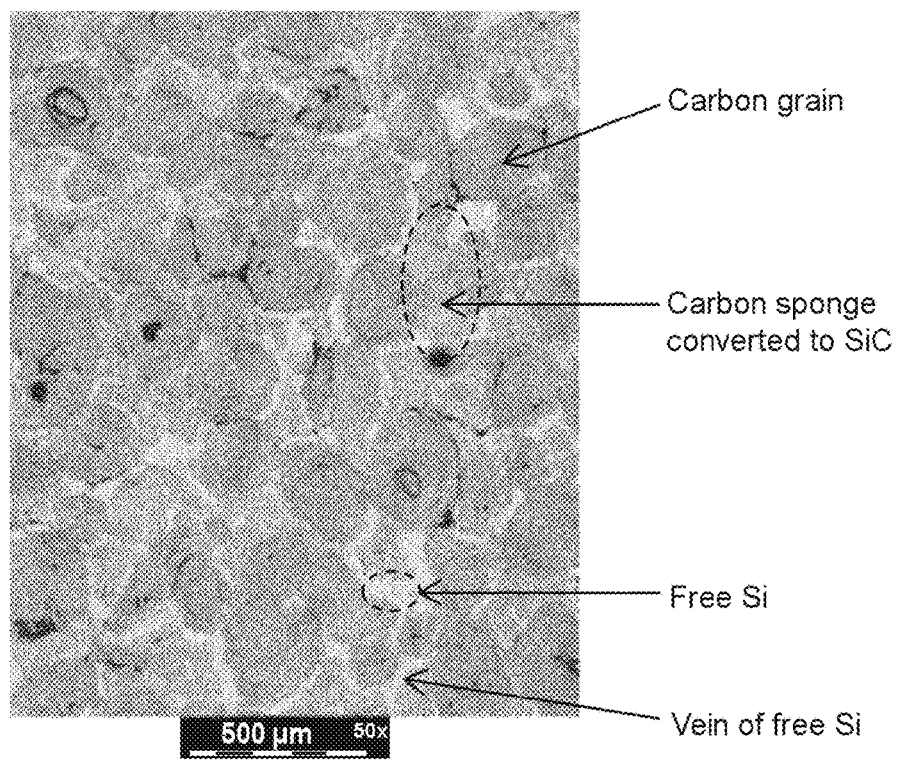

The microsection in FIG. 3a) shows a ceramic component based on carbon, which has been produced using 3D-printing. No impregnation, in particular not with a solution or a resin system within the meaning of the present invention, was performed here prior to siliconisation. Large lakes or regions of free silicon and the coating of carbon grains with SiC are clearly visible. The microsection according to FIG. 3b) shows that the pores of the sponge-like carbon skeleton have been converted into silicon carbide after the siliconisation of a carbonised green body shown in FIG. 2. There are no large lakes or regions of free silicon here, but these lakes or regions are filled with silicon carbide formations, so that often only veins of free silicon are present. This leads to a more homogeneous structural composition of the ceramic component.

EXAMPLES

The production of the green body based on carbon according to step a) of our method according to the invention can be performed using the methods described in WO 2017/089494.

A calcined acetylene coke having a d50 of 190 μm was used. It was initially mixed with 1.0 wt. % of a sulphuric acid liquid activator for phenolic resin, based on the total weight of coke and activator, and processed using a 3D-printing powder bed machine. A rack unit placed a thin layer of coke powder (approx. 0.3 mm high) on a flat powder bed and a kind of inkjet printing unit printed an alcoholic phenolic resin solution onto the coke bed according to the desired component geometry. Subsequently, the pressure table was lowered by the thickness of the layers and another layer of coke was applied and phenolic resin was again printed locally. The repeated procedure was used to build up rectangular test bodies having dimensions of 120 mm (length)×20 mm (width)×20 mm (height), for example. As soon as the complete "component" was printed, the powder bed was placed in an oven preheated to 140° C. and kept there for about 6 hours, wherein the phenolic resin cured and formed a dimensionally stable green body. The excess coke powder was then vacuumed after cooling and the green body was removed.

Inventive Example 1

The green body based on carbon, produced by means of a 3D-printing method, was subjected to impregnation under negative pressure with a mixture containing a resol resin (phenolic resin) with the trade name Norsophen 1203, water as solvent and para-toluenesulfonic acid (dissolved in water) as curing agent. The curing agent content in this mixture was 3.0 wt. %. Advantageously, the content of the curing agent in the aforementioned mixture is not greater than 10.0 wt. %, more preferably the content of the curing agent is between 1.0 and 6.0 wt. %, particularly preferably between 2.0 and 5.0 wt. %, in the aforementioned mixture. If the amount of the curing agent in this mixture exceeds 10.0 wt. %, the carbonisation of the cured resin system does not result in the creation of a fine-pored, sponge-like carbon skeleton and the pot time of the resin system for the impregnation treatment is too short. If the content of the curing agent in the aforementioned mixture is significantly less than 1.0 wt. %, there is insufficient creation of a fine-pored sponge-like carbon skeleton and the curing time becomes too long. However, if the content of the curing agent in the aforementioned mixture is between 2.0 and 5.0 wt. %, this content of binding agent ensures a good creation of a fine-pored sponge-like carbon skeleton from the cured resin system after the carbonisation. At the same time, the pot time of the resin is within a practicable range.

This impregnation was followed by curing at room temperature for at least 12 hours before the cured green body was carbonised at 900° C. under a nitrogen atmosphere. For the carbonisation treatment, a slow heating curve over 3 days at 900° C. was chosen to ensure that no bursting of the green body occurred, caused by the sudden evaporation of the solution, i.e. water. This carbonised green body was then placed in a siliconisation oven, wherein the green body was placed on wicks. These wicks in this case were positioned in a silica powder bulk, wherein this bulk itself was located in a coated graphite crucible. The oven was then heated under vacuum to approximately 1600° C. Thereby the silicon powder became liquid and rose by pure capillary effect via the wicks into the 3D-printed, carbonised green body, without the need for additional gas or liquid pressure. Large parts of the carbon reacted with the liquid silicon and formed silicon carbide. After the oven had cooled down, the ceramic components were removed and the wicks were removed mechanically. The ceramic component obtained had a free carbon content of 41 wt. %, a free silicon content of 17 wt. % and a silicon carbide content of 42 wt. %. The density of the ceramic component obtained was 2.4 g/cm$^3$ and was determined using the Archimedes method according to DIN 51918.

Non-Inventive Example:

The green body based on carbon, which was produced using a 3D-printing method, was subjected to a dip impregnation with a furan resin (10 parts furfuryl alcohol, 1 part maleic anhydride). After the stepwise curing of the impregnated body using a temperature of up to 160°, the body was carbonised and siliconised analogous to the example according to the invention. The component obtained had a free carbon content of 47 wt. %, a free silicon content of 30 wt. % and a silicon carbide content of 23 wt. %. The density of the ceramic component obtained was 2.2 g/cm$^3$ and was determined using the Archimedes method.

The following Table 1 lists the properties of the ceramic components containing silicon carbide produced according to the non-inventive and the inventive example. The values listed here are average values.

TABLE 1

|  | Strength [MPa] | E-modulus [GPa] | Breaking energy [Nmm] | Breaking elongation [%] | Universal hardness [MPa] |
|---|---|---|---|---|---|
| Non-inventive example | 50 | 33 | 150 | 0.18 | 2500 |
| Inventive example | 75 | 38 | 300 | 0.20 | 3000 |

The strength was determined using the 3-point bending method according to DIN 51902. The breaking energy was determined from the surface of the bending deformation curve of the 3-point bending method. The breaking elongation and stiffness (E-modulus) were also determined using the aforementioned 3-point bending method. The universal hardness was determined according to DIN 50359-1.

As the comparison of the examples shows, the strength, the stiffness (E-modulus) and the fracture energy are higher for the ceramic component according to the invention than for the ceramic component according to the state of the art. Due to the higher SiC amount of 42 wt. % of the component according to inventive example 1 compared to an SiC amount of 23 wt. % according to the non-inventive example, a significant increase in the hardness of the ceramic component according to the invention (inventive example 1) compared to the ceramic component according to the non-inventive component can be found. The lower amount of free silicon (17 wt. %) in the ceramic component according to the invention will increase the temperature resistance and chemical resistance of the component compared to components according to the state of the art.

The invention claimed is:

1. A ceramic component containing silicon carbide (SiC) obtained by a method comprising the following steps:
   a) providing a green body based on carbon, which has been produced by means of a 3D-printing method,
   b) impregnating the green body with a solution selected from the group consisting of a sugar solution, a starch solution or a cellulose solution, or a resin system comprising a mixture containing at least one resin, at least one solvent and at least one curing agent, wherein the at least one resin and the at least one solvent are different,
   c) drying or curing the impregnated green body,
   d) carbonising the dried or cured green body, wherein a fine-pored, foam-like carbon skeleton is formed from the dried solution or a fine-pored, sponge-like carbon skeleton is formed from the cured resin system,
   e) siliconising the carbonised green body by infiltration with liquid silicon;
wherein the component contains 20 to 60 wt. % SiC, 5 to 40 wt. % free silicon and 10 to 65 wt. % free carbon.

2. The ceramic component according to claim 1, wherein the green body according to step a) has been produced using coke.

3. The ceramic component according to claim 1, wherein the green body according to step a) contains SiC in addition to carbon.

4. The ceramic component according to claim 1, wherein the at least one resin in step b) is a phenolic resin, a furan resin or any mixture of a phenolic resin and a furan resin.

5. The ceramic component according to claim 1, wherein the at least one solvent is selected from the group consisting of water, a mono- or polyhydric alcohol, a mixture of at least two of the aforementioned alcohols, a mixture of water and at least one mono- and/or polyhydric alcohol or naphthalene.

6. The ceramic component according to claim 1, wherein the curing agent in step b) is an inorganic or organic acid.

7. The ceramic component according to claim 1, wherein the at least one solvent is replaced by at least one blowing agent.

8. The ceramic component according to claim 7, wherein the at least one resin is a two-constituent resin.

9. The ceramic component according to claim 1, wherein the curing in step c) is performed at room temperature or by using a temperature which is lower than the boiling temperature of the solvent used or the solvent mixture.

10. The ceramic component according to claim 1, wherein the sponge-like carbon skeleton of the carbonised green body from step d) has an average pore size of less than 50 µm.

11. The ceramic component according to claim 1, wherein after carbonising according to step d), the steps of impregnating according to step b), curing according to step c) and carbonising according to step d) are repeated at least once in the order mentioned before the siliconising according to step e) is performed.

12. The ceramic component according to claim 1, wherein the component has a breaking work of at least 200 Nmm.

13. The ceramic component according to claim 1, wherein the strength of the component is at least 40 MPa.

14. Use of a component containing silicon carbide (SiC) obtained by a method comprising the following steps:
   a) providing a green body based on carbon, which has been produced by means of a 3D-printing method,
   b) impregnating the green body with a solution selected from the group consisting of a sugar solution, a starch solution or a cellulose solution, or a resin system comprising a mixture containing at least one resin, at least one solvent and at least one curing agent, wherein the at least one resin and the at least one solvent are different,
   c) drying or curing the impregnated green body,
   d) carbonising the dried or cured green body, wherein a fine-pored, foam-like carbon skeleton is formed from the dried solution or a fine-pored, sponge-like carbon skeleton is formed from the cured resin system,
   e) siliconising the carbonised green body by infiltration with liquid silicon,
as an impeller and a separating or rotary vane in pumps and compressors, as a pump housing, as a burner nozzle, as burner inserts, as a lining for burner walls, as installations in columns, as static mixer elements, as turbulators, as an electrical contact, as an electrical heating element and as a support frame in high-temperature ovens, as a classifier wheel for mills, as a heat exchanger or element for heat exchangers, as cooling bodies in electronics, as a cooling housing for light-emitting diodes or cameras, as measuring gauges, as a sliding element in bearings or hinges comprising slide bearings and sliding ring seals, as a cam in transmissions, as a toothed gear, as a sliding plate and sliding tube of flexible shafts, as a piston and piston sleeve, as a hot press matrix, as friction elements for clutches and brakes or as processing tools in the form of milling cutters, drills, drill heads and reversing cutting plates;
wherein the component contains 20 to 60 wt. % SiC, 5 to 40 wt. % free silicon and 10 to 65 wt. % free carbon.

* * * * *